United States Patent
Wang et al.

(10) Patent No.: US 10,827,555 B2
(45) Date of Patent: *Nov. 3, 2020

(54) SIGNAL INDICATION FOR 5G/NEW RADIO

(71) Applicant: Verizon Patent and Licensing Inc., Arlington, VA (US)

(72) Inventors: Xin Wang, Morris Plains, NJ (US); Andrew E. Youtz, Princeton, NJ (US); Hui Zhao, Marlboro, NJ (US); Lily Zhu, Parsippany, NJ (US); Samirkumar Patel, Middlesex, NJ (US); Balaji L. Raghavachari, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,983

(22) Filed: Oct. 18, 2019

(65) Prior Publication Data

US 2020/0092935 A1 Mar. 19, 2020

Related U.S. Application Data

(63) Continuation of application No. 15/907,052, filed on Feb. 27, 2018, now Pat. No. 10,499,449.

(51) Int. Cl.
*H04W 76/27* (2018.01)
*H04W 56/00* (2009.01)
(Continued)

(52) U.S. Cl.
CPC ............ *H04W 76/27* (2018.02); *H04B 7/06* (2013.01); *H04B 17/00* (2013.01); *H04L 5/0048* (2013.01); *H04W 16/28* (2013.01); *H04W 24/10* (2013.01); *H04W 56/001* (2013.01); *H04W 72/082* (2013.01); *H04W 4/70* (2018.02)

(58) Field of Classification Search
CPC ... H04W 76/27; H04W 56/001; H04W 24/10; H04W 16/28; H04W 72/082; H04W 4/70; H04L 5/0048; H04B 17/00; H04B 7/06
See application file for complete search history.

(56) References Cited

U.S. PATENT DOCUMENTS

2018/0183855 A1* 6/2018 Sabella ................... G06F 9/505
2018/0249453 A1* 8/2018 Nagaraja .............. H04B 7/0634
(Continued)

*Primary Examiner* — Ajay Cattungal (57) ABSTRACT

A device, a computer-readable medium, and a method provide for determining, based on a network synchronization signal, a signal power value for a wireless communication; determining, based on the network synchronization signal, a signal quality value for the wireless communication; generating, using the signal power value and the signal quality value, a signal strength associated with a next generation network connection; determining a state of the device, wherein the state relates to a next generation network connection state and a fourth generation (4G)/Long Term Evolution (4G/LTE) network connection state of the device; providing for display a network indicator indicating whether the device is associated with a 4G/LTE network connection or the next generation network connection, wherein the network indicator is based on the state of the device; and providing, for display, a first signal indicator indicating the signal strength.

20 Claims, 5 Drawing Sheets

(51) Int. Cl.
*H04W 24/10* (2009.01)
*H04W 16/28* (2009.01)
*H04L 5/00* (2006.01)
*H04W 72/08* (2009.01)
*H04B 17/00* (2015.01)
*H04B 7/06* (2006.01)
*H04W 4/70* (2018.01)

(56) References Cited

U.S. PATENT DOCUMENTS

| | | | |
|---|---|---|---|
| 2018/0310257 A1* | 10/2018 | Papasakellariou | H04W 52/242 |
| 2018/0338265 A1* | 11/2018 | Goel | H04L 61/106 |
| 2018/0351611 A1* | 12/2018 | Nagaraja | H04W 52/0229 |
| 2018/0368009 A1* | 12/2018 | Xia | H04W 24/04 |
| 2018/0368016 A1* | 12/2018 | Lee | H04B 17/318 |
| 2019/0021080 A1* | 1/2019 | Lei | H04B 7/0617 |
| 2019/0037425 A1* | 1/2019 | Hong | H04B 7/06 |
| 2019/0044754 A1* | 2/2019 | Hampel | H04B 7/2606 |
| 2019/0044984 A1* | 2/2019 | Chiang | H04L 65/1089 |
| 2019/0053160 A1* | 2/2019 | He | H04W 52/0206 |
| 2019/0053228 A1* | 2/2019 | Akkarakaran | H04W 72/02 |
| 2019/0053244 A1* | 2/2019 | Mildh | H04W 72/046 |
| 2019/0069205 A1* | 2/2019 | Lee | H04W 36/00835 |
| 2019/0069226 A1* | 2/2019 | Lee | H04B 17/30 |
| 2019/0069229 A1* | 2/2019 | Lee | H04W 48/18 |

* cited by examiner

SIGNAL INDICATION FOR 5G/NEW RADIO

RELATED APPLICATION

This application is a continuation of application Ser. No. 15/907,052 filed Feb. 27, 2018, the contents of which are hereby incorporated by reference herein.

BACKGROUND

5G/New Radio (5G/NR) provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like. User equipment (UEs) during the transition between 4G/Long Term Evolution (4G/LTE) and 5G/NR can support the simultaneous use of 4G/LTE and 5G/NR.

DETAILED DESCRIPTION OF PREFERRED EMBODIMENTS

The following detailed description of example implementations refers to the accompanying drawings. The same reference numbers in different drawings can identify the same or similar elements.

A UE can provide dual connectivity with regard to two or more radio access technologies (RATs). One dual connectivity configuration is E-UTRAN-NR dual connectivity (EN-DC), which can provide dual connectivity between an Evolved Universal Mobile Telecommunications System (UMTS) Terrestrial Radio Access network (E-UTRAN), such as 4G/LTE, and a NR network, such as 5G/NR. For example, the 4G/LTE network can provide a fallback option when 5G/NR coverage is not adequate or when some services (e.g., Voice over Internet Protocol (VoIP), such as Voice over LTE (VoLTE), and/or other services) are not deployed on the 5G/NR network.

A UE can provide information identifying a network to which the UE is connected and/or a signal strength of the UE with regard to the network. For example, when the UE is connected to a 4G/LTE network, the UE can provide a network indicator indicating that the UE is connected to the 4G/LTE network, and can provide a signal indicator that indicates a signal strength and/or signal quality of the 4G/LTE network.

When configured for EN-DC, a UE can provide a network indicator and/or a signal indicator for 5G/NR. This can present certain challenges in comparison to 4G/LTE, for example, based on the multiple beams that can be used to communicate in 5G/NR and based on different measurement values being useful for determining signal strength. Furthermore, a UE configured for EN-DC can also be associated with a 4G/LTE connection. In some cases, it can be undesirable to provide network indicators and signal indicators associated with two different networks (e.g., 4G/LTE and 5G/NR). For example, a user interface of the UE can become cluttered when too many indicators (e.g., signal indicators and/or network indicators) are provided. Thus, it can be desirable to selectively configure whether network indicators associated with 4G/LTE and/or 5G/NR, and/or signal indicators associated with 4G/LTE and/or 5G/NR, are provided. In some cases, some signal measurements may not be available in certain UE states. For example, when the EN-DC device is in an RRC Idle state, the EN-DC device may not be able to measure a 5G/NR signal. Furthermore, in certain scenarios, frequent changing of signal indicators and/or network indicators may not provide satisfactory user experience.

Some implementations described herein can provide determination of a signal indicator for 5G/NR based on at least two measurement values determined based on a 5G/NR synchronization signal. For example, some implementations described herein can determine the signal indicator based on at least one best beam of multiple 5G/NR beams. Some implementations described herein can selectively determine a state of a UE with regard to a 4G/LTE connection and/or a 5G/NR connection, and can provide network indicators and/or signal indicators for 4G/LTE and 5G/NR based on the state and based on a configuration of the UE. For example, the configuration can indicate that part of or all of the network indicators and/or signal indicators are to be provided. Thus, accuracy of determination of the signal indicator can be improved and user interface resources, such as user interface space, can be conserved.

While determination of the signal indicator is primarily described herein as being performed using two measurement values, some implementations described herein may use a single measurement value or a different number of measurement values (e.g., three measurement values, five measurement values, and so on).

Figure 1A:
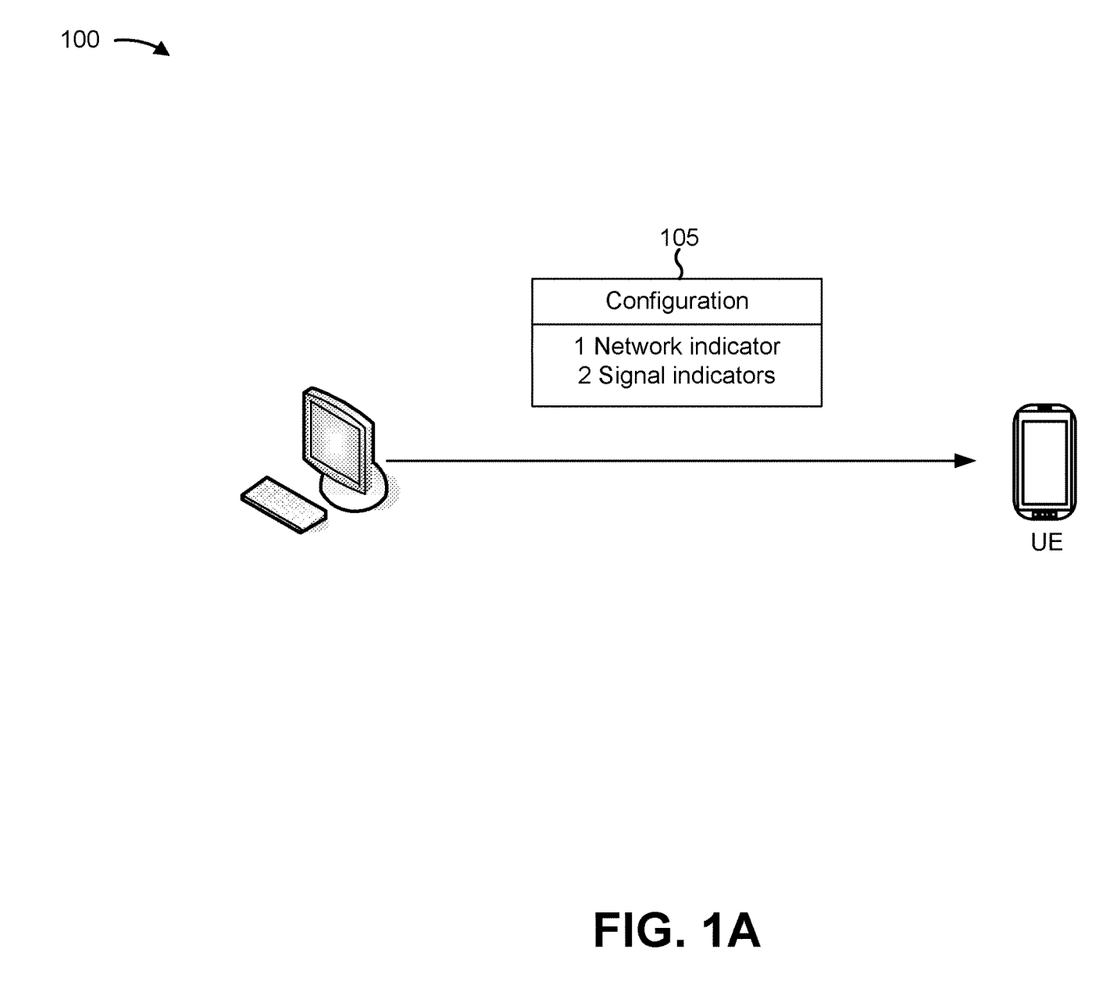
FIGS. 1A and 1B are diagrams of an overview of an example implementation described herein.
Figure 1B:
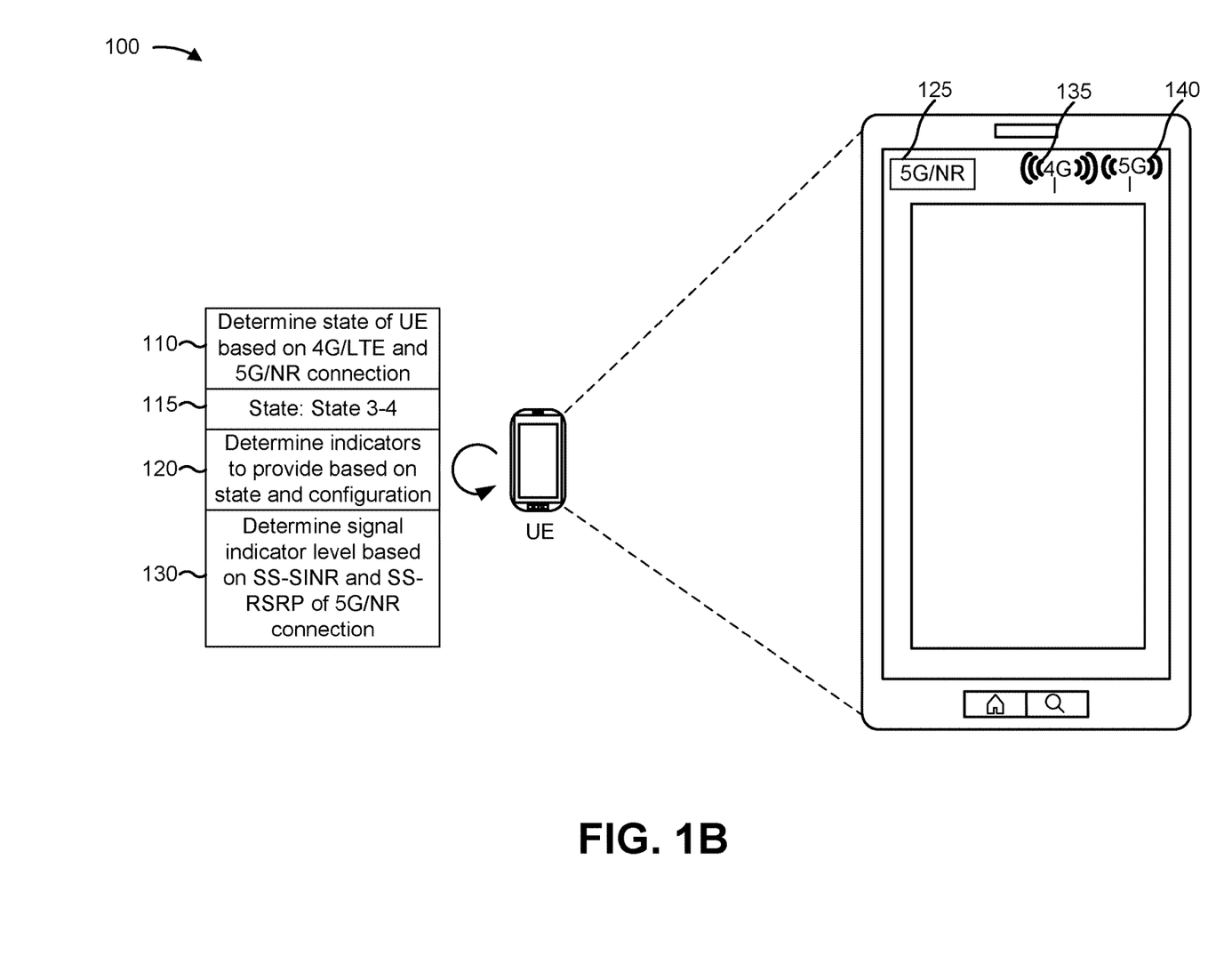

FIGS. 1A and 1B are diagrams of an overview of an example implementation 100 described herein. As shown, FIGS. 1A and 1B include a UE, which can be UE 210 described in more detail below.

As shown in FIG. 1A, and by reference number 105, the UE can receive information identifying a configuration. In some implementations, the UE can receive the information identifying a configuration from an application running on the UE, or from a device external to the UE. The configuration can indicate whether the UE is to provide network indicators for 4G/LTE and/or 5G/NR (e.g., a number of network indicators that the UE is to provide), whether the UE is to provide signal indicators for 4G/LTE and/or 5G/NR (e.g., a number of signal indicators that the UE is to provide), and/or whether the UE is to provide traffic indicators for 4G/LTE and 5G/NR (e.g., a number of traffic indicators that the UE is to provide). Here, the configuration indicates to provide one network indicator, two signal indicators, and does not indicate to provide any traffic indicators. In some implementations, the configuration can indicate whether the UE is to provide an indicator (e.g., a network indicator, a signal indicator, and/or a traffic indicator) for 4G/LTE or 5G/NR based on a state of the UE (e.g., based on a 4G/LTE connection state of the UE and/or a 5G/NR connection state of the UE).

A network indicator can indicate a radio access technology (RAT) of a network to which the UE is connected. For example, the network indicator can indicate "4G/LTE" (or a similar value) when the UE is connected to a 4G/LTE network, and can indicate "5G/NR" (or a similar value)

when the UE is connected to a 5G/NR network. In some implementations, the UE can provide two network indicators (e.g., one for 4G/LTE and one for 5G/NR), which can provide more information regarding a connection state of the UE than providing a single network indicator. In some implementations, the UE can provide a single network indicator, which can conserve user interface resources and processor resources that would otherwise be used to generate and provide two network indicators. The UE can determine whether to provide zero, one, or two network indicators based on the configuration.

A signal indicator can indicate a signal strength for a particular RAT to which the UE is connected. For example, the signal indicator can include a number of bars that indicates a signal strength or signal quality. In some implementations, the UE can provide two signal indicators (e.g., one for 4G/LTE and one for 5G/NR), which can provide more information regarding a connection state of the UE than providing a single signal indicator. In some implementations, the UE can provide a single signal indicator, which can conserve user interface resources and processor resources that would otherwise be used to generate and provide two signal indicators. The UE can determine whether to provide zero, one, or two signal indicators based on the configuration.

A traffic indicator can indicate whether the UE is to perform data transfer using a particular RAT. For example, the traffic indicator can provide up or down arrows (or another indicator) when data transfer is being performed using a particular RAT. In some implementations, the UE can provide two traffic indicators (e.g., one for 4G/LTE and one for 5G/NR), which can provide more information regarding a connection state of the UE than providing a single traffic indicator. In some implementations, the UE can provide a single traffic indicator, which can conserve user interface resources and processor resources that would otherwise be used to generate and provide two traffic indicators. The UE can determine whether to provide zero, one, or two traffic indicators based on the configuration.

As shown in FIG. 1B, and by reference number 110, the UE can determine a state of the UE. The state can be based on a radio resource control connection state of the UE with regard to a 4G/LTE network, a connection state of the UE with regard to a 5G/NR network, whether the UE is performing data transfer with regard to the 4G/LTE network and/or the 5G/NR network, and/or the like. For a more detailed description of determination of the state, refer to FIG. 4, below. As shown by reference number 115, the UE determines a state of State 3-4, which is also described in more detail in connection with FIG. 4, below. State 3-4 can be a state wherein data is being transferred on a 4G/LTE connection (e.g., a master cell group for the 4G/LTE connection) and on a 5G/NR connection (e.g., a secondary cell group for the 5G/NR connection).

As shown by reference number 120, the UE can determine indicators (e.g., network indicators, signal indicators, and/or traffic indicators) to provide based on the state and the configuration. Here, as described above, the configuration indicates to provide one network indicator and two signal indicators. The UE can determine whether the one network indicator is to identify the 4G/LTE connection or the 5G/NR connection based on the state and based on the configuration. For example, the configuration can indicate that the network indicator is to identify the 4G/LTE connection for some states of the UE, and that the network indicator is to identify the 5G/NR connection for other states of the UE. Here, the UE determines that the network indicator is to identify the 5G/NR connection, and as shown by reference number 125, the UE provides, for display, the network indicator identifying the 5G/NR connection. In some implementations, the network indicator identifying the 5G/NR connection on a mmWave frequency range can use a different user interface design compared with the network indicator identifying the 5G/NR connection on a sub-6 GHz frequency range.

As shown by reference number 130, the UE can determine a signal indicator level for the 5G/NR connection. For example, the UE can determine the signal indicator based on a first measurement value (here, a synchronization signal signal to interference plus noise ratio or a synchronization signal signal to noise and interference ratio) and a second measurement value (here, a synchronization signal reference signal received power) of the 5G/NR connection. For a more detailed description of determination of the signal indicator level based on the first measurement value and the second measurement value, refer to the description of FIG. 4, below.

As shown by reference number 135, the UE can provide a first signal indicator for the 4G/LTE connection. As further shown, the first signal indicator can indicate a signal strength or signal quality of the 4G/LTE connection. Here, the first signal indicator identifies three bars, although any other configuration of signal strength or signal quality is possible.

As shown by reference number 140, the UE can provide a second signal indicator for the 5G/NR connection. As further shown, the second signal indicator can indicate a signal strength or signal quality of the 5G/NR connection. For example, the signal strength or signal quality can be determined based on the first measurement value and the second measurement value, as described in more detail elsewhere herein.

The signal indicator for the 5G/NR connection can use a different user interface design compared with the signal indicator of the 4G/LTE connection. Further, the signal indicator for the 5G/NR connection on the mmWave frequency range can use a different user interface design compared with the signal indicator for the 5G/NR connection on the sub-6 GHz frequency range.

In this way, the UE determines a number and configuration of network indicators and signal indicators based on a state of the UE and a configuration of the UE. By providing network indicators and/or signal indicators for fewer than all networks to which the UE is connected, processor and user interface resources are conserved. By providing network indicators and/or signal indicators for all networks to which the UE is connected, more complete information regarding the state of the UE is provided.

As indicated above, FIGS. 1A and 1B are provided merely as examples. Other examples are possible and can differ from what was described with regard to FIGS. 1A and 1B.

Figure 2:
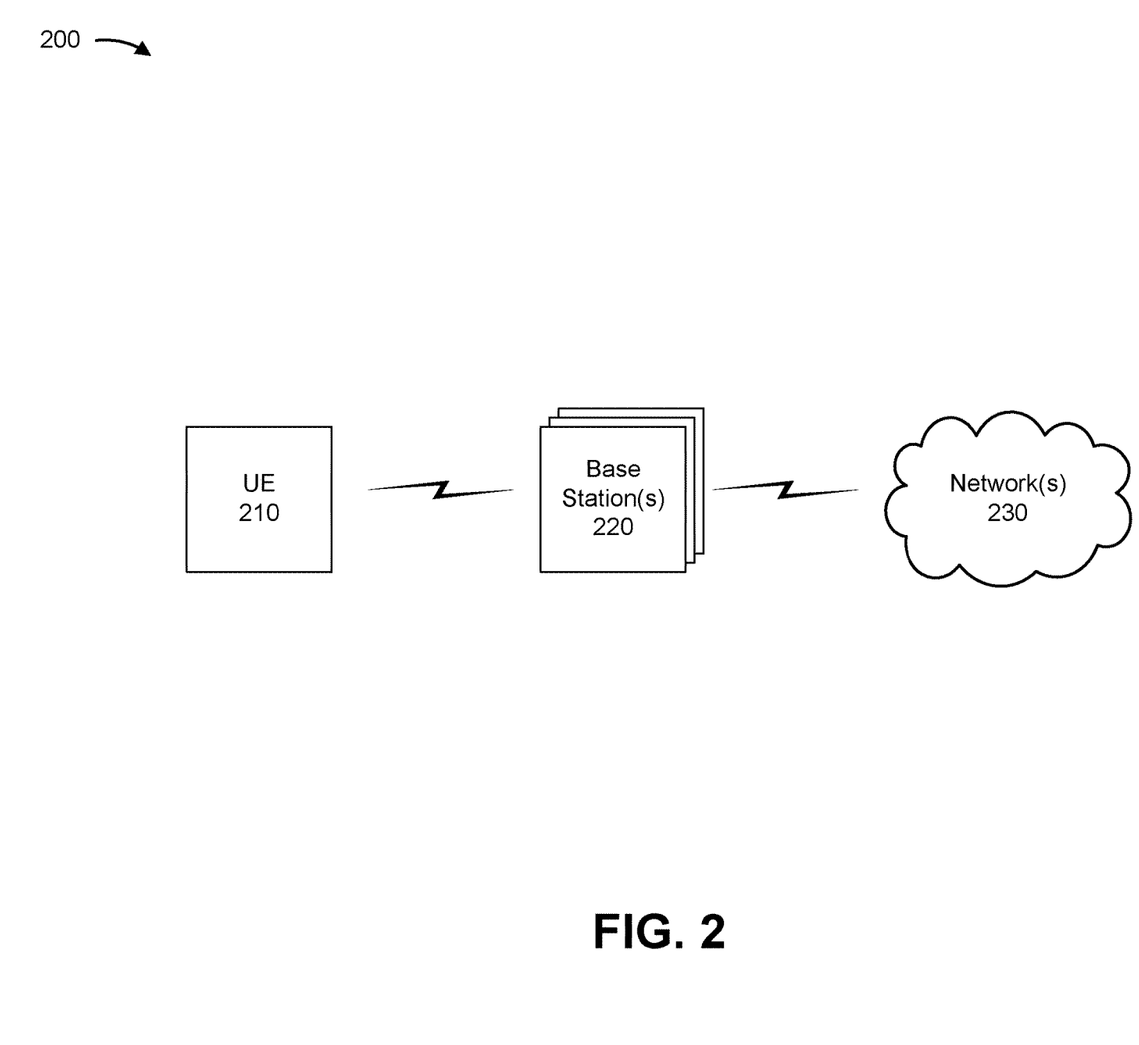
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a UE 210, one or more base stations 220, and one or more networks 230. Devices of environment 200 can interconnect via wired connections, wireless connections, or a combination of wired and wireless connections.

UE 210 can include one or more devices capable of communicating with base station 220 and/or a network (e.g., network 230). For example, UE 210 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, a mobile hotspot device, a fixed wireless access device, a customer premises equipment, and/or a similar device. UE 210 can be capable of communicating using uplink (e.g., UE to base station) communications, downlink (e.g., base station to UE) communications, and/or sidelink (e.g., UE-to-UE) communications. In some implementations, UE 210 can include a machine-type communication (MTC) UE, such as an evolved or enhanced MTC (eMTC) UE. In some implementations, UE 210 can include an Internet of Things (IoT) UE, such as a narrowband IoT (NB-IoT) UE and/or the like. In some implementations, UE 210 can be capable of communicating using multiple RATs, as described in more detail in connection with FIG. 5, below.

Base station 220 includes one or more devices capable of communicating with UE 210 using a cellular RAT. For example, base station 220 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 220 can transfer traffic between UE 210 (e.g., using a cellular RAT), other base stations 220 (e.g., using a wireless interface or a backhaul interface, such as a wired backhaul interface), and/or network 230. Base station 220 can provide one or more cells that cover geographic areas. Some base stations 220 can be mobile base stations. Some base stations 220 can be capable of communicating using multiple RATs.

In some implementations, base station 220 can perform scheduling and/or resource management for UEs 210 covered by base station 220 (e.g., UEs 210 covered by a cell provided by base station 220). In some implementations, base stations 220 can be controlled or coordinated by a network controller, which can perform load balancing, network-level configuration, and/or the like. The network controller can communicate with base stations 220 via a wireless or wireline backhaul. In some implementations, base station 220 can include a network controller, a self-organizing network (SON) module or component, or a similar module or component. In other words, a base station 220 can perform network control, scheduling, and/or network management functions (e.g., for other base stations 220 and/or for uplink, downlink, and/or sidelink communications of UEs 210 covered by the base station 220). In some implementations, base station 220 can include a central unit and multiple distributed units. The central unit can coordinate access control and communication with regard to the multiple distributed units. The multiple distributed units can provide UEs 210 and/or other base stations 220 with access to network 230.

Network 230 includes one or more wired and/or wireless networks. For example, network 230 can include a cellular network (e.g., a code division multiple access (CDMA) network, a 3G network, a 4G/LTE network, a 5G/NR network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
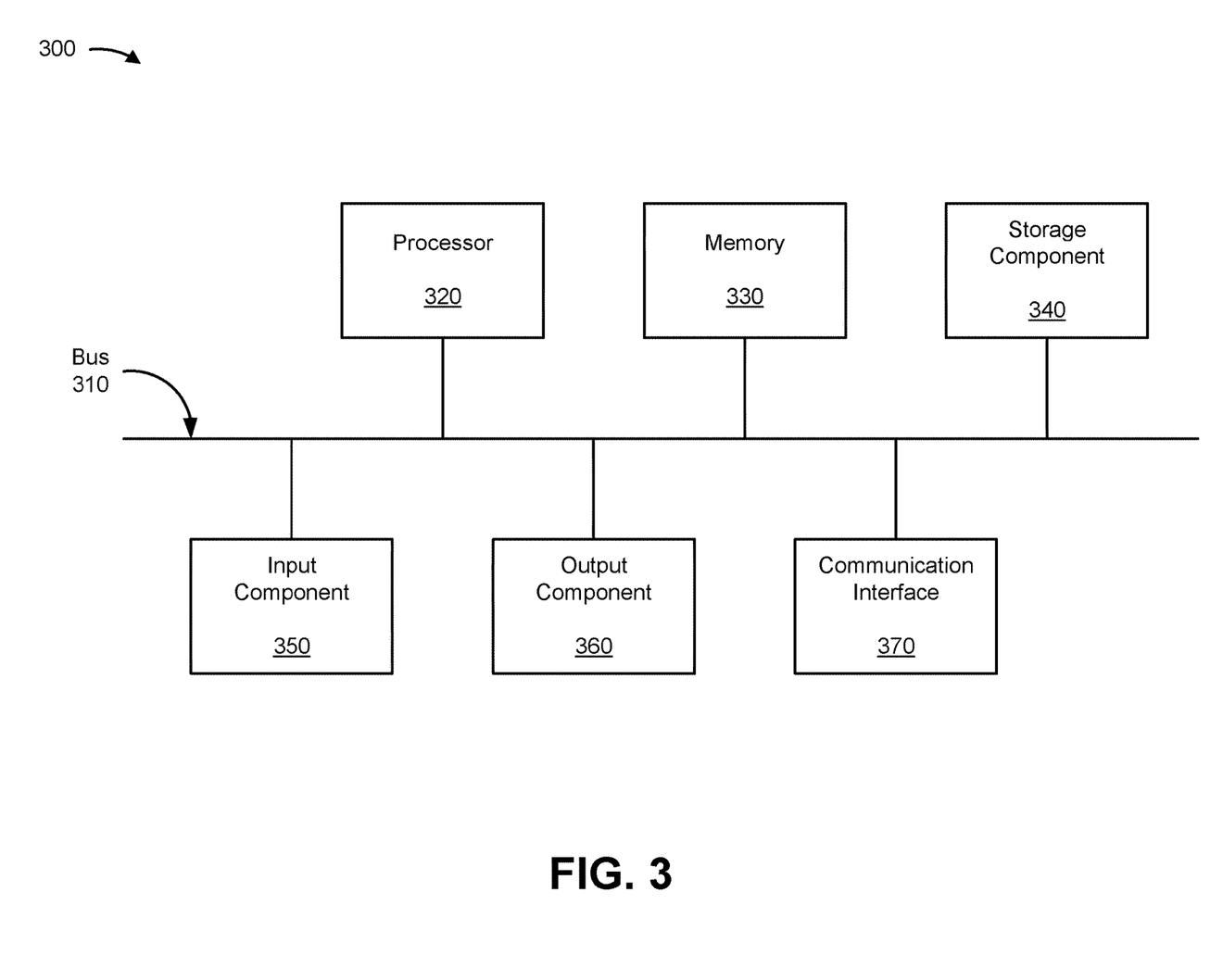
FIG. 3 is a diagram of example components of one or more devices of FIG. 2.

FIG. 3 is a diagram of example components of a device 300. Device 300 can correspond to UE 210 and base station 220. In some implementations, UE 210 and/or base station 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
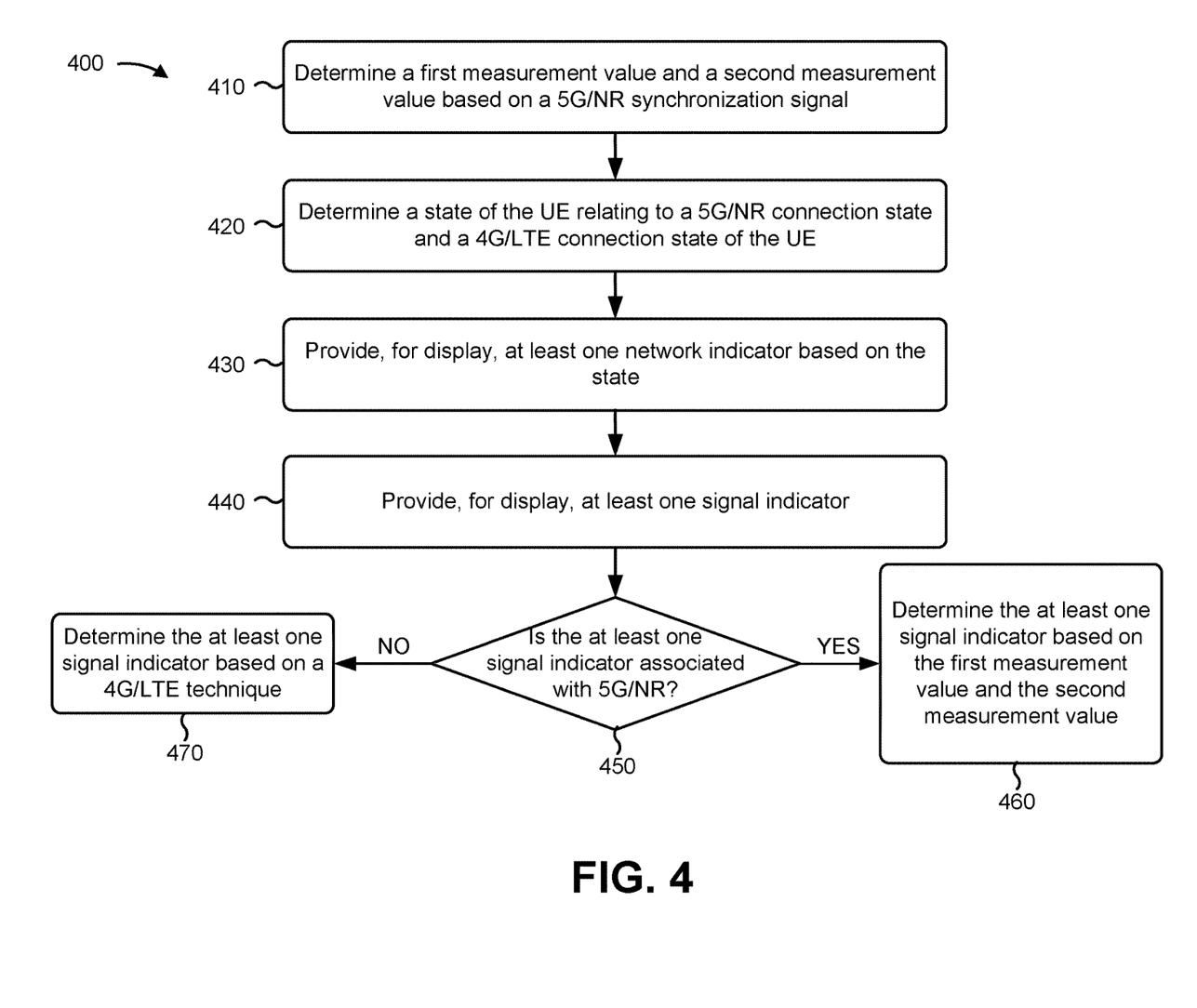
FIG. 4 is a flow chart of an example process for determining a signal indicator and/or a network indicator based on a configuration of a UE and a state of the UE.

FIG. 4 is a flow chart of an example process 400 for determining a signal indicator and/or a network indicator based on a configuration of a UE and a state of the UE. In some implementations, one or more process blocks of FIG. 4 can be performed by UE 210. In some implementations, one or more process blocks of FIG. 4 can be performed by another device or a group of devices separate from or including UE 210, such as base station 220.

As shown in FIG. 4, process 400 can include determining a first measurement value and a second measurement value based on a 5G/NR synchronization signal (block 410). For example, UE 210 (e.g., using processor 320 and/or the like) can determine a first measurement value and a second measurement value. UE 210 can determine the first measurement value based on a 5G/NR synchronization signal, such as a primary synchronization signal (PSS), a secondary synchronization signal (SSS), a beam reference signal (BRS), a beam refinement reference signal (BRRS), a phase noise reference signal, demodulation reference signals for physical broadcast channel (PBCH), if indicated by higher layers, channel state information (CSI) reference signals in addition to secondary synchronization signals (e.g., if indicated by a higher layer), and/or the like. In some implementations, the first measurement value can be a signal power value. For example, the first measurement value can include a reference signal received power (RSRP), such as a synchronization signal RSRP (SS-RSRP). In some implementations, the second measurement value can be a signal quality value. For example, the second measurement value can include a signal to interference plus noise ratio (SINR), such as a synchronization signal SINR (SS-SINR). By determining the first measurement value and the second measurement value, UE 210 improves accuracy of measurement of signal conditions in comparison to determining a single measurement value.

In some implementations, the first measurement value and the second measurement value can be for a particular cell, such as a primary secondary cell (PSCell) of a secondary cell group (SCG) that comprises the 5G/NR connection. In some implementations, the first measurement value and the second measurement value can be based on filtered measurements (e.g., Layer-1 filtered measurements). In some implementations, the first measurement value and the second measurement value can be reported by a modem of UE 210 at a particular frequency. For example, in some implementations, the modem reporting frequency can be at least one report per second. In some implementations, UE 210 can determine the first measurement value and/or the second measurement value based on a combination of multiple measurement values. For example, UE 210 can maintain a running average of reported first measurement values and a running average of reported second measurement values over a time window of a particular length (e.g., 3 seconds, 5.5 seconds, 10 seconds, etc.). A level of the 5G/NR signal indicator level can be determined based on the average first measurement value and the average second measurement value.

In some implementations, UE 210 can determine the first measurement value and/or the second measurement value based on a plurality of beams. For example, in certain 5G/NR deployments, such as mmWave deployments and massive multiple-input multiple-output deployments, UE 210 and base station 220 can communicate using a plurality of receive beams (at UE 210) and a plurality of transmit beams (at base station 220). In such a case, UE 210 can determine the first measurement value and the second measurement value based on the plurality of beams. For example, UE 210 can determine first measurement values and second measurement values for two or more beams, and can use a best first measurement value and a best second measurement value of the determined values. In some cases, the best first measurement value and the best second measurement value can be for different beams. In such a case, UE 210 can use the best first measurement value and the best second measurement value for the different beams, since this is a more accurate representation of channel conditions than using a suboptimal first measurement value and/or second measurement value.

As further shown in FIG. 4, process 400 can include determining a state of the UE relating to a 5G/NR connection state and a 4G/LTE connection state of the UE (block 420). For example, UE 210 (e.g., using processor 320 and/or the like) can determine a state of the UE 210. The state can relate to a 5G/NR connection state (e.g., when a 5G/NR connection has been established) and a 4G/LTE connection state of the UE 210. For example, UE 210 can store information identifying various states that are associated with particular combinations of 5G/NR connection states and 4G/LTE connection states, and can identify a particular state based on a current combination of 5G/NR connection states and 4G/LTE connection states of UE 210. By determining the state of UE 210, UE 210 can be able to determine whether a 5G/NR signal indicator should be provided, and can be able to determine a particular configuration of network indicator to provide.

In some implementations, the state can be based on an EN-DC state of the UE 210. For example, the state can be selected from a set of three states based on whether a 4G/LTE connection of the UE 210 exists and/or is active, whether a 5G/NR connection of the UE 210 exists, and whether data transfer is occurring on the 4G/LTE connection and/or the 5G/NR connection. The set of three states are described in turn below. In each of the three states described below, assume that UE 210 is attached to the evolved packet core (EPC).

The UE 210 can be associated with the first state when the UE 210 is either not allowed or not configured to use 5G/NR (e.g., based on a non-access stratum (NAS) message received from a mobility management entity (MME)), or when the 4G/LTE cell that the UE 210 is camped on in a radio resource control (RRC) idle state or the 4G/LTE primary cell (PCell) to which UE 210 is connected in an RRC connected state does not support EN-DC (e.g., based on RRC broadcast system information from the 4G/LTE cell).

The UE 210 can be associated with the second state when the UE 210 is allowed or configured to use 5G/NR (e.g., based on a NAS message received from the MME), and when the 4G/LTE cell on which the UE 210 is camped in an RRC idle state, or the 4G/LTE PCell to which the UE 210 is connected in an RRC connected state, supports EN-DC (e.g., based on RRC broadcast system information from the 4G/LTE cell). When in the RRC connected state, the UE 210 might not be configured with a 5G/NR Secondary Cell Group (SCG). In some implementations, the second state can be divided into the following sub-states:

Sub-state 2-1: UE 210 is in the RRC idle state.
Sub-state 2-2: UE 210 is in the RRC Connected state, and there is no active data transfer.
Sub-state 2-3: UE 210 is in the RRC Connected state and there is active data transfer.

The UE 210 can be associated with the third state when the UE 210 is attached to the EPC. Furthermore, the UE 210 can be associated with the third state when the UE 210 is allowed or configured to use 5G/NR based on a NAS message received from the MME, and when the UE 210 is in an RRC Connected state and the 4G/LTE PCell to which the UE 210 is connected supports EN-DC (e.g., based on RRC broadcast system information from the LTE cell), and when the UE 210 is configured with a 5G/NR Secondary Cell Group (SCG). In some implementations, the third state can be divided into the following sub-states:

Sub-state 3-1: There is no active data transfer between UE 210 and base station 220.
Sub-state 3-2: There is active data transfer on the 4G/LTE master cell group (MCG) only.

As further shown in FIG. 4, process 400 can include providing, for display, at least one network indicator based on the state (block 430). For example, UE 210 (e.g., using output component 360 and/or communication interface 370) can provide for display at least one of: a network indicator associated with 4G/LTE, a network indicator associated with 5G/NR, a signal indicator associated with 4G/LTE, a signal indicator associated with 5G/NR, a traffic indicator associated with 4G/LTE, and/or a traffic indicator associated with 5G/NR. The provision of the signal indicator is described in more detail in connection with block 440, below. UE 210 can select which network indicator or network indicators are to be provided based on the state of UE 210, as described below.

In some implementations, UE 210 can provide the network indicators, signal indicators, and/or traffic indicators based on a configuration. The configuration can identify particular network indicators, signal indicators, and/or traffic indicators are to be provided in each state of UE 210 (e.g., the states described in connection with block 420, above). In some implementations, UE 210 can store information identifying a configuration of UE 210. For example, UE 210 can be configured with the configuration by base station 220, by a vendor of UE 210, and/or the like. In some implementations, a vendor of UE 210 can support selection of the configuration via a software update. The vendor can provide a lab application, a hidden menu, and/or the like to modify the configuration option during testing or configuration of UE 210. In some implementations, UE 210 might not allow a consumer to update the configuration through a user interface of UE 210.

In one configuration, UE 210 can be configured to provide two network indicators at a time, and can be configured to provide two signal indicators at a time. In such a case, a chart of which indicators can be provided with regard to particular states is shown below:

|  | UE 210 State | 4G Network Indicator | 4G Signal Indicator | 4G Traffic Indicator | 5G Network Indicator | 5G Signal Indicator | 5G Traffic Indicator |
|---|---|---|---|---|---|---|---|
|  | State 1 | Legacy | Legacy | Legacy | No | No | No |
| State 2 | Sub-state 2-1 | Legacy | Legacy | Legacy | Yes | No | No |
|  | Sub-state 2-2 | Legacy | Legacy | Legacy | Yes | No | No |
|  | Sub-state 2-3 | Legacy | Legacy | Legacy | Yes | No | No |
| State 3 | Sub-state 3-1 | Legacy | Legacy | Legacy | Yes | Yes | No |
|  | Sub-state 3-2 | Legacy | Legacy | Legacy | Yes | Yes | No |
|  | Sub-state 3-3 | Legacy | Legacy | Legacy | Yes | Yes | Yes |
|  | Sub-state 3-4 | Legacy | Legacy | Legacy | Yes | Yes | Yes |

Sub-state 3-3: There is active data transfer on the 5G/NR secondary cell group (SCG) only.
Sub-state 3-4: There is active data transfer on both LTE MCG and NR SCG.

In a second configuration, UE 210 can be configured to provide one network indicator at a time, and can be configured to provide two signal indicators at a time. In such a case, a chart of which indicators can be provided with regard to particular states is shown below.

|  | UE 210 State | 4G Network Indicator | 4G Signal Indicator | 4G Traffic Indicator | 5G Network Indicator | 5G Signal Indicator | 5G Traffic Indicator |
|---|---|---|---|---|---|---|---|
|  | State 1 | Legacy | Legacy | Legacy | No | No | No |
| State 2 | Sub-state 2-1 | No | Legacy | N/A | Yes | No | No |
|  | Sub-state 2-2 | No | Legacy | N/A | Yes | No | No |
|  | Sub-state 2-3 | No | Legacy | N/A | Yes | No | Yes |
| State 3 | Sub-state 3-1 | No | Legacy | N/A | Yes | Yes | No |
|  | Sub-state 3-2 | No | Legacy | N/A | Yes | Yes | Yes |
|  | Sub-state 3-3 | No | Legacy | N/A | Yes | Yes | Yes |

-continued

| UE 210 State | 4G Network Indicator | 4G Signal Indicator | 4G Traffic Indicator | 5G Network Indicator | 5G Signal Indicator | 5G Traffic Indicator |
|---|---|---|---|---|---|---|
| Sub-state 3-4 | No | Legacy | N/A | Yes | Yes | Yes |

In a third configuration, UE 210 can be configured to provide two network indicators at a time, and can be configured to provide one signal indicator at a time. In such a case, a chart of which indicators can be provided with regard to particular states is shown below.

| UE 210 State | | 4G Network Indicator | 4G Signal Indicator | 4G Traffic Indicator | 5G Network Indicator | 5G Signal Indicator | 5G Traffic Indicator |
|---|---|---|---|---|---|---|---|
| State 1 | | Legacy | Legacy | Legacy | No | No | No |
| State 2 | Sub-state 2-1 | Legacy | Legacy | Legacy | Yes-Gray | No | No |
| | Sub-state 2-2 | Legacy | Legacy | Legacy | Yes-Gray | No | No |
| | Sub-state 2-3 | Legacy | Legacy | Legacy | Yes-Gray | No | No |
| State 3 | Sub-state 3-1 | Legacy | Legacy | Legacy | Yes | No | No |
| | Sub-state 3-2 | Legacy | Legacy | Legacy | Yes | No | No |
| | Sub-state 3-3 | Legacy | Legacy | Legacy | Yes | No | Yes |
| | Sub-state 3-4 | Legacy | Legacy | Legacy | Yes | No | Yes |

In a fourth configuration, UE 210 can be configured to provide one network indicator at a time, and can be configured to provide one signal indicator at a time. In such a case, a chart of which indicators can be provided with regard to particular states is shown below.

| UE 210 State | | 4G Network Indicator | 4G Signal Indicator | 4G Traffic Indicator | 5G Network Indicator | 5G Signal Indicator | 5G Traffic Indicator |
|---|---|---|---|---|---|---|---|
| State 1 | | Legacy | Legacy | Legacy | No | No | No |
| State 2 | Sub-state 2-1 | No | Legacy | N/A | Yes | No | No |
| | Sub-state 2-2 | No | Legacy | N/A | Yes | No | No |
| | Sub-state 2-3 | No | Legacy | N/A | Yes | No | Yes |
| State 3 | Sub-state 3-1 | No | Legacy | N/A | Yes | No | No |
| | Sub-state 3-2 | No | Legacy | N/A | Yes | No | Yes |
| | Sub-state 3-3 | No | Legacy | N/A | Yes | No | Yes |
| | Sub-state 3-4 | No | Legacy | N/A | Yes | No | Yes |

In the above charts, "Legacy" indicates that the display of the indicator can follow legacy device behavior, depending on whether 4G/LTE is available, whether UE 210 is on a 1× voice call, and/or the like. "Yes" indicates the corresponding indicator is provided for display. "Yes-Gray" indicates that a grayed-out version of the indicator is provided, although any modification to the indicator is possible and contemplated herein. "No" indicates that the corresponding indicator is not displayed. The states and sub-states are the same states and sub-states described in connection with block 420, above.

As further shown in FIG. 4, process 400 can include providing, for display, at least one signal indicator (block 440). For example, UE 210 (e.g., using output component 360 and/or communication interface 370) can provide, for display, at least one signal indicator. As shown by block 450, in some implementations, the at least one signal indicator may be associated with 5G/NR (block 450—YES), and additionally or alternatively may be associated with 4G/LTE (block 450—NO). As shown by block 460, when the at least one signal indicator is associated with 5G/NR, UE 210 can determine the at least one signal indicator based on the first measurement value and the second measurement value. As shown by reference number 470, when the at least one signal indicator is associated with 4G/LTE, UE 210 can determine the at least one signal indicator based on a 4G/LTE technique.

In some implementations, UE 210 can provide a first signal indicator based on a signal strength and/or signal quality of a 4G/LTE connection of UE 210, and can provide a second signal indicator based on a signal strength and/or signal quality of a 5G/NR connection of the UE 210 (e.g., based on the first measurement value and the second measurement value), which can provide more complete information about the state and signal strength or quality of UE 210. In some implementations, UE 210 can provide a single signal indicator for 4G/LTE or 5G/NR, which conserves user interface resources, such as user interface space, and which conserves processor resources that would otherwise be used to generate multiple signal strength indicators. In some implementations, a signal strength indicator for 4G/LTE can use a different icon or design than a signal strength indicator for 5G/NR.

As one particular example, the signal indicator for 5G/NR can use three indicator levels (e.g., one bar, two bars, and three bars, or a similar configuration). In such a case, UE 210 can determine an indicator level based on the first measurement value and the second measurement value. For example, the indicator level can be a lower value or a lowest value of indicator levels associated with the first measurement value and the second measurement value. UE 210 can determine which indicator level, of the three indicator levels, is to be assigned for a measurement value based on two thresholds. For example, when the measurement value does not satisfy the first threshold, UE 210 can assign a first (e.g., lowest) indicator level. When the measurement value satisfies the first threshold and does not satisfy a second threshold higher than the first threshold, UE 210 can assign a second (e.g., intermediate) indicator level. When the measurement value satisfies the second threshold, UE 210 can assign a third (e.g., highest) indicator level.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, UE 210 determines a number and configuration of network indicators and signal indicators based on a state of UE 210 and a configuration of UE 210. By providing network indicators and/or signal indicators for fewer than all networks to which UE 210 is connected, processor and user interface resources are conserved. By providing network indicators and/or signal indicators for all networks to which UE 210 is connected, more complete information regarding the state of UE 210 is provided.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Some user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of," etc.).

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
a communication interface;
a memory to store instructions; and
a processor configured to execute the instructions to:
determine, based on a network synchronization signal, a signal power value for a wireless communication;
determine, based on the network synchronization signal, a signal quality value for the wireless communication;
generate, using the signal power value and the signal quality value, a signal strength associated with a 5G/NR network connection;
determine a state of the device, wherein the state relates to a 5G/NR network connection state and a fourth generation (4G)/Long Term Evolution (4G/LTE) network connection state of the device;
provide for display, via the communications interface, a network indicator indicating whether the device is associated with a 4G/LTE network connection or the 5G/NR network connection, wherein the network indicator is based on the state of the device; and provide for display, via the communication interface, a first signal indicator indicating the signal strength.

2. The device of claim 1, wherein the signal power value comprises a reference signal received power (RSRP) value, and the signal quality value comprises a signal-to-interference plus noise ratio (SINR).

3. The device of claim 1, wherein the network synchronization signal comprises at least one of a primary synchronization signal, a secondary synchronization signal, a beam reference signal, a beam refinement reference signal, a phase noise reference signal, demodulation reference signals for a physical broadcast channel, or channel state information reference signals.

4. The device of claim 1, wherein the first signal indicator is based on at least one of a lower level of signal levels associated with the signal power value or a lower level of signal levels associated with the signal quality value.

5. The device of claim 1, wherein the first signal indicator is based on a lower level of signal levels associated with the signal power value and a lower level of signal levels associated with the signal quality value.

6. The device of claim 1, wherein the processor further executes the instructions to provide, for display, a traffic indicator indicating whether the device is to perform a data transfer via the 4G/LTE network connection or the 5G/NR network connection.

7. The device of claim 1, wherein the processor further executes the instructions to provide, for display, a second signal indicator indicating a signal strength associated with the 4G/LTE network connection.

8. A non-transitory computer-readable medium storing instructions which, when executed by one or more processors of a device, cause the one or more processors to:

determine, based on a network synchronization signal, a signal power value for a wireless communication;

determine, based on the network synchronization signal, a signal quality value for the wireless communication;

generate, using the signal power value and the signal quality value, a signal strength associated with a 5G/NR network connection:

determine a state of the device, wherein the state relates to a 5G/NR network connection state and a fourth generation (4G)/Long Term Evolution (4G/LTE) network connection state of the device; and provide, for display, a network indicator indicating whether the device is associated with a 4G/LTE network connection or the 5G/NR network connection, wherein the network indicator is based on the state of the device; and provide, for display, a first signal indicator indicating the signal strength.

9. The non-transitory computer-readable medium of claim 8, wherein the signal power value comprises a reference signal received power (RSRP) value, and the signal quality value comprises a signal-to-interference plus noise ratio (SINR).

10. The non-transitoty computer-readable medium of claim 8, wherein the synchronization signal comprises at least one of a primary synchronization signal, a secondary synchronization signal, a beam reference signal, a beam refinement reference signal, a phase noise reference signal, demodulation reference signals for a physical broadcast channel, or channel state information reference signals.

11. The non-transitory computer-readable medium of claim 8, wherein the first signal indicator is based on at least one of a lower level of signal levels associated with the signal power value or a lower level of signal levels associated with the signal quality value.

12. The non-transitory computer-readable medium of claim 8, wherein the first signal indicator is based on a lower level of signal levels associated with the signal power value and a lower level of signal levels associated with the signal quality value.

13. The non-transitory computer-readable medium of claim 12, wherein the one or more processors further executes the instructions to provide, for display, a traffic indicator indicating whether the device is to perform a data transfer via the 4G/LTE network connection or the 5G/NR network connection.

14. A method comprising:

determining, based on a network synchronization signal, a signal power value for a wireless communication;

determining, based on the network synchronization signal, a signal quality value for the wireless communication;

generating, using the signal power value and the signal quality value, a signal strength associated with a 5G/NR network connection;

determining a state of a device, wherein the, state relates to a 5G/NR network connection state and a fourth generation (4G)/Long Term Evolution (4G/LTE) network connection state of the device;

providing, for display, a network indicator indicating whether the device is associated with a 4G/LTE network connection or the 5G/NR network connection, wherein the network indicator is based on the state of the device; and providing, for display, a first signal indicator indicating the signal strength.

15. The method of claim 14, wherein the signal power value comprises a reference signal received power (RSRP) value, and the signal quality value comprises a signal-to-interference plus noise ratio (SINR).

16. The method of claim 14, wherein the network synchronization signal comprises at least one of a primary synchronization signal, a secondary synchronization signal, a beam reference signal, a beam refinement reference signal, a phase noise reference signal, demodulation reference signals for a physical broadcast channel, or channel state information reference signals.

17. The method of claim 14, wherein the first signal indicator is based on at least one of a lower level of signal levels, associated with the signal power value or a lower level of signal levels associated with the signal quality value.

18. The method of claim 14, wherein the first signal indicator is based on a lower level of signal levels associated with the signal power value and a lower level of signal levels associated with the signal quality value.

19. The method of claim 14, further comprising:

providing, for display, a traffic indicator indicating whether the device is to perform a data transfer via the 4G/LTE network connection or the 5G/NR network connection.

20. The method of claim 14, further comprising:

providing, for display, of a second signal indicator indicating a signal strength associated with the 4G/LTE network connection.

* * * * *